(12) United States Patent
Aritomi et al.

(10) Patent No.: US 6,830,671 B2
(45) Date of Patent: Dec. 14, 2004

(54) ION-EXCHANGE MEMBRANE

(75) Inventors: Toshio Aritomi, Tsukuba (JP); Minoru Kawashima, Tsukuba (JP)

(73) Assignee: Tokuyama Corporation, Yamaguchi-ken (JP)

( * ) Notice: Subject to any disclaimer, the term of this patent is extended or adjusted under 35 U.S.C. 154(b) by 0 days.

(21) Appl. No.: 10/183,500

(22) Filed: Jun. 28, 2002

(65) Prior Publication Data

US 2003/0024816 A1 Feb. 6, 2003

(30) Foreign Application Priority Data

Jun. 29, 2001 (JP) ........................................ 2001-198018

(51) Int. Cl.$^7$ ................................................ B01D 61/44
(52) U.S. Cl. ...................... 204/539; 204/531; 204/522; 204/296; 205/697; 205/703
(58) Field of Search ................................ 204/296, 539, 204/531, 522; 205/697, 703

(56) References Cited

U.S. PATENT DOCUMENTS

| | | | |
|---|---|---|---|
| 3,484,293 A | | 12/1969 | Hodgdon, Jr. |
| 4,505,797 A | * | 3/1985 | Hodgdon et al. ........... 204/252 |
| 4,677,135 A | | 6/1987 | Mishima ...................... 521/62 |
| 4,948,508 A | | 8/1990 | Nakagawa et al. .... 210/500.33 |
| 5,338,420 A | * | 8/1994 | Aga et al. ................... 204/522 |

FOREIGN PATENT DOCUMENTS

| | | |
|---|---|---|
| FR | 2 280 669 | 2/1976 |
| GB | 1148051 | 4/1969 |

OTHER PUBLICATIONS

Hodgdon et al., "Macroreticular Anion Exchange Membranes for Electrodialysis in the Presence of Surface Water Foulants", Desalination, 13, pp. 105–127, 1973, no month available.

* cited by examiner

*Primary Examiner*—Bruce F. Bell
(74) *Attorney, Agent, or Firm*—Wenderoth, Lind & Ponack, L.L.P.

(57) ABSTRACT

An ion-exchange membrane having excellent resistance against organic fouling by high molecular weight organic ions etc. and showing low electric resistance is provided. Said ion-exchange membrane is characterized by that a polyether compound containing polyalkylene glycol chain, such as polyethylene glycol, polypropylene glycol, their derivatives, etc., is fixed on the surface and/or inside of the membrane. As examples of the mode of the fixation there are mentioned fixation by entanglement of the molecules forming the membrane and the molecules of the polyether compound, physical fixation of both molecules by the anchor effect, and chemical fixation of both molecules by the formation of covalent bond or ionic bond. Said ion-exchange membrane can be preferably used in case of removing low molecular weight electrolytes from an aqueous solution containing low molecular weight electrolytes and high molecular weight organic ions etc. through electrodialysis.

9 Claims, No Drawings

ION-EXCHANGE MEMBRANE

FIELD OF APPLICATION IN INDUSTRIES

This invention relates to a novel ion-exchange membrane and a method for removing low molecular weight electrolytes from an aqueous solution of said low molecular weight electrolytes containing high-molecular organic components by electrodialysis using said ion-exchange membrane.

PRIOR ART

In general, in case an aqueous solution of salts containing organic substances, particularly macromolecules, which become to have electric charge through ionization or intramolecular polarization (hereinafter referred to also as organic macroions etc.), is desalinated by ion-exchange membrane electrodialysis, there comes up a problem of so-called organic fouling of membrane, that organic macroions etc. in the solution to be treated stick to the ion-exchange membrane and deteriorate the performance of the membrane. When the organic fouling comes up, the electric resistance of the membrane increases, the current efficiency decreases, pH of the solution changes and so forth and thus the electrodialytic performance deteriorates.

Up to now, there have been proposed as an ion-exchange membrane, which inhibits organic fouling, an ion-exchange membrane that easily transmits organic macroions etc., or an ion-exchange membrane that prevents organic macroions etc. from penetration into the membrane at a surface layer part of the membrane. As a method to facilitate the transmission of organic macroions etc. through the membrane, a method to loosen the membrane structure is known (Desalination, 13, 105 (1973)). But, when the membrane structure is loosened, the ion selectivity decreases inevitably and consequently no efficient desalination can be conducted. On the other hand, as an ion-exchange membrane that prevents organic macroions etc. from penetrating into the membrane there is one to which a thin layer, that is neutral, amphoteric, or oppositely charged to the ion-exchange group, is formed on the surface of the membrane. The more dense the membrane structure is, or the higher the molecular weight of organic macroions etc. is, the more remarkable is the effect. There is reported, for example, an anion-exchange membrane that prevents organic anions from penetrating into the membrane through introduction of oppositely charged sulfonic acid group to the surface layer part of the resin membrane having anion-exchange group (Japanese Patent Publication No. 40556/1976), etc.

Problems the Invention is Going to Solve

Although the ion-exchange membrane disclosed in the above-mentioned publication has a resistance against organic fouling to some extent, it has a disadvantage that the electric resistance of the ion-exchange membrane (hereinafter referred to as membrane resistance) increases remarkably by the aforementioned oppositely charged layer put on the surface layer part of the resin membrane. The purpose of the present invention is, therefore, to provide an ion-exchange membrane having excellent resistance against organic fouling and showing low electric resistance.

Means of Solving the Problems

The present inventors have been intensively continuing research aiming at improvement of the resistance against organic fouling of the conventional ion-exchange membrane. As a result, they have found that the resistance against organic fouling can be given to an ion-exchange membrane with almost no increase in membrane resistance of the ion-exchange membrane by fixing a hydrophilic polyether compound to the ion-exchange membrane, and completed the present invention.

Thus, according to the present invention, there is provided an ion-exchange membrane characterized by that a polyether compound having polyalkylene glycol chain is fixed on the surface of the membrane and/or inside of the membrane.

According to the present invention, there is also provided a method for manufacturing an aqueous solution, whose concentration of low molecular weight electrolytes is reduced, characterized by removing the low molecular weight electrolytes by electrodialysis using the above-mentioned ion-exchange membrane from an aqueous solution containing low molecular weight electrolytes, as the electrolytes to be removed, comprising organic acids or inorganic acids with molecular weight of 1,000 or less or organic salts or inorganic salts with molecular weight of 1,000 or less, and high molecular weight organic compounds or organic ions with higher molecular weight than said low molecular weight electrolytes.

The ion-exchange membrane of the present invention is one in which a polyether compound having polyalkylene glycol chain (hereinafter simply referred to as polyether compound) is fixed on the surface of the membrane and/or inside of the membrane. In this case an ion-exchange membrane means a resin membrane of hydrocarbon type or fluorine type having cation-exchange ability or anion-exchange ability. Cation-exchange ability and anion-exchange ability are expressed by the existence of a cation-exchange group and an anion-exchange group, respectively. As such an ion-exchange group there is no strict limitation, if it is a functional group capable of being negatively or positively charged in an aqueous solution. Specifically there are mentioned, as cation-exchange groups, sulfonic acid group, carboxylic acid group, phosphonic acid group, etc. and generally sulfonic acid group, a strongly acid group, is preferably used. As anion-exchange groups there are mentioned primary to tertiary amino groups, quaternary ammonium groups, pyridyl groups, imidazole groups, quaternary pyridinium groups, etc. and generally quaternary ammonium groups and quaternary pyridinium groups, which are strongly basic groups, are preferably used.

The ion-exchange membrane may be of any kind, irrespective of polymerization type, condensation type, homogeneous type, heterogeneous type, etc., with or without reinforcing core materials, or kind or form of ion-exchange membrane depending upon the materials or manufacturing methods. Many of organic macroions, however, are anions and therefore anion-exchange membranes often suffer organic fouling and their performance is deteriorated. Therefore, the ion-exchange membrane in the present invention is preferably an anion-exchange membrane, because the effect of the present invention to inhibit the deterioration of dialytic performance of electrodialysis is remarkable.

The ion-exchange membrane of the present invention has the biggest characteristic in the fixation of a polyether compound on the surface and/or inside of the membrane having the above-mentioned ion-exchange group. It is thought that the existence of a polyether compound on the surface and/or inside of the ion-exchange membrane prevents the ion-exchange groups from the direct contact of organic macroions etc., inhibits the adsorption of organic macroions etc. to the ion-exchange membrane, and consequently improves the resistance against organic fouling. Moreover, the polyether compound can inhibit the increase of the electric resistance of the ion-exchange membrane to a great extent due to the hydrophilic property originated from the alkylene glycol chain. Further, in the ion-exchange membrane of the present invention, the polyether compound is fixed to the ion-exchange membrane itself, for example, the polyether compound does not dissolve in the solution to be dialyzed, in case the electrodialysis is conducted using said ion-exchange membrane, and the excellent effect of the resistance against organic fouling can be maintained for a long time.

Moreover, in general, in case the electrodialysis is conducted to a solution containing organic substances as the solution to be treated using an ion-exchange membrane, periodical membrane washing is conducted with an alkaline solution etc. for the purpose of removing fouling substances stuck to the ion-exchange membrane in order to maintain a stable operation for a long period. As a polyether compound is stable against an alkaline solution compared with other hydrophilic compounds, for example, compounds having ester bond or amide bond, it is usually possible to conduct an effective membrane washing by using an aqueous solution of an alkali, such as an aqueous solution of sodium hydroxide, aqueous ammonia, etc., effective for washing fouling substances comprising organic substances such as organic macroions etc.

As the polyether compound used in the present invention, known compounds can be used without any restriction, if it is a compound having a molecular chain of polyalkylene glycol. A molecular chain of polyalkylene glycol can be shown by the following formula:

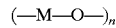

(wherein M is an alkylene group with carbon number 2–10 and n is an integer of 1–4000.) As an alkylene group in this case there can be mentioned, ethylene group, trimethylene group, propylene group, butylene group, pentylene group, etc. Although the effect of the present invention is sufficiently achieved if n is an integer of 1–4000, n is preferably an integer of 2–2000 in order to exhibit more effective resistance against organic fouling.

The polyether compound in the present invention may have any other groups, if it has a molecular chain of polyalkylene glycol. For example, it may have at a side chain or at the terminal substituent such as hydroxyl group, carbonyl group, amino group, nitro group, vinyl group, alkyl group (methyl group, ethyl group, propyl group, isopropyl group, n-butyl group, t-butyl group, etc.), benzyl group, sulfonyl group, tosyl group, tetrahydropyranyl group, carboxyl group, acetyl group, epoxy group, methoxy group, ethoxy group, etc., or have an onium-ionized structure such as ammonium, oxonium, phosphonium, sulfonium, selenonium, telluronium.

Such a polyether compound is synthesized by polycondensation of glycol, polycondensation of glycol and acetal, addition polymerization of aldehydes, ring-opening polymerization of cyclic ether, ring-opening polymerization of cyclic acetal, etc. Though the molecular weight of such polyether compounds is not particularly restricted, it is preferable to be 30–200,000, more preferably 50–100,000, and particularly preferably 100–50,000 for exhibiting more effective resistance against organic fouling. In case of a polyether compound with low molecular weight, effect of inhibiting the adsorption of organic macroions is low, and in case the molecular weight is too high, it may cause the increase of the electric resistance of the ion-exchange membrane.

As specific examples of the polyether compound usable preferably in the present invention, there can be mentioned, polyethylene glycol, polypropylene glycol, poly(propylene glycol)bis(2-aminopropyl ether), poly(ethylene glycol)bis(2-aminopropyl ether), poly(ethylene glycol)bis(3-aminopropyl ether), poly(propylene glycol)-block-poly(ethylene glycol)-block-poly(propylene glycol)bis(2-aminopropyl ether), poly(ethylene glycol) acrylate, poly(ethylene glycol)bis(carboxymethyl)ether, poly(ethylene glycol)bis(2-ethylhexanoate), poly(ethylene glycol) butyl ether, poly(ethylene glycol) diacrylate, poly(ethylene glycol) dibenzoate, poly(ethylene glycol) diglycidyl ether, poly(ethylene glycol) dimethacrylate, poly(ethylene glycol) dimethyl ether, poly(ethylene glycol) divinyl ether, poly(ethylene glycol) ethyl ether methacrylate, poly(ethylene glycol) methyl ether, poly(ethylene glycol) methyl ether acrylate, poly(ethylene glycol) methyl ether methacrylate, poly(ethylene glycol) monolaurate, poly(ethylene glycol) 4-nonylphenyl ether acrylate, poly(ethylene glycol) 4-phenyl ether acrylate, poly(ethylene glycol) 2,4,6-tris(1-phenylethyl)phenyl ether methacrylate, poly(propylene glycol) acrylate, poly(propylene glycol) bis(carboxymethyl) ether, poly(propylene glycol) bis(2-ethylhexanoate), poly(propylene glycol) butyl ether, poly(propylene glycol) diacrylate, poly(propylene glycol) dibenzoate, poly(propylene glycol) diglycidyl ether, poly(propylene glycol) dimethacrylate, poly(propylene glycol) dimethyl ether, poly(propylene glycol) divinyl ether, poly(propylene glycol) ethyl ether methacrylate, poly(propylene glycol) methyl ether, poly(propylene glycol) methyl ether acrylate, poly(propylene glycol) methyl ether methacrylate, poly(propylene glycol) monolaurate, poly(propylene glycol) 4-nonylphenyl ether acrylate, poly(propylene glycol) 4-phenyl ether acrylate, poly(propylene glycol) 2,4,6-tris(1-phenylethyl)phenyl ether methacrylate, etc. Such a polyether compound can be used not only each singly, but also a plurality of them can be used together.

Such a polyether compound is enough to exist on the surface and/or inside of the ion-exchange membrane. From the viewpoint of the effect of inhibiting the adsorption of organic macroions to the ion-exchange membrane, however, it is preferable that its large amount exists at the surface layer part of the membrane. In case the molecular weight of the organic macroions etc. is sufficiently high and their concentration is not so high, it is enough that the polyether compound exists usually at the surface layer part of the ion-exchange membrane, but in case the molecular weight of the organic macroions etc. is relatively low or their concentration is high, the existence of polyether compound inside of the membrane is effective against the organic fouling inside of the membrane.

The fixing amount of the polyether compound in the ion-exchange membrane of the present invention is not particularly restricted, but it is preferable from the viewpoint of effect to be 0.001–60, more preferably 0.001–30% by weight, and particularly preferably 0.01–10% by weight, based upon the total weight of the membrane in dry state. If the fixed amount of the polyether compound is small, the effect of the resistance against organic fouling does not express, and if it is too much, the electric resistance may increase.

The mode of the fixation of the polyether compound in the ion-exchange membrane of the present invention is not particularly restricted, if it is not a simply physical adsorption that is easily desorbed, but the polyether compound is bound to the membrane in such a form that it is not easily dissolved from the membrane even in case, for example, of being dipped in water. As preferable examples of the fixing mode, there can be mentioned, fixation by entanglement of the molecules forming the membrane and the molecules of the polyether compound, physical fixation of both molecules by so-called anchor effect, chemical fixation of both molecules by the formation of covalent bond or ionic bond, etc.

The existence of the polyether compound existing in the ion-exchange membrane can be confirmed by the following methods. The polyether compound existing in the ion-exchange membrane in the present invention can be confirmed by observing the absorption near 1100 cm$^{-1}$ based upon C—O—C stretching vibration by using infrared absorption spectroscopy (IR). In case the confirmation by IR method is difficult due to the small amount of the existing polyether compound, said polyether compound can be confirmed by decomposing the ether bond of the polyether compound with ether bond cleavage reagent such as mixture of acetic anhydride-p-toluenesulfonic acid, phosphoric acid, hydrobromic acid, hydroiodic acid, etc., and analyzing the produced decomposition products. For example, when an ion-exchange membrane containing a polyether compound is reacted with hydroiodic acid, an iodide of alkylene is formed and confirmed by using chromatograph, Zeisel method, etc.

The ion-exchange membrane of the present invention may be manufactured by any method. It is preferable, however, to adopt a method enabling to physically or chemically fix the polyether compound to the ion-exchange membrane, in order to maintain the excellent resistance against organic fouling for a long time. As a method capable of physically fixing the polyether compound, there can be mentioned, for example, 1) method to form a mixture of a polyether compound and a compound having an ion-exchange group into the shape of a film,
2) method to form a mixture of a monomer composition comprising a monomer having a functional group, capable of introducing an ion-exchange group, or an ion-exchange group, crosslinking monomer and a polymerization initiator, and a polyether compound into the shape of a film, then to polymerize the monomer composition, and to introduce a cation-exchange group or an anion-exchange group, as necessary,
3) method to coat a solution, in which a polyether compound is dispersed, onto the ion-exchange membrane and then to remove the solvent,
4) method to combine these 1)–3) methods, etc.

As a method capable of chemically fixing, though not particularly restricted, there can be mentioned, for example, a method to manufacture an ion-exchange membrane, in which a haloalkyl group has been introduced, according to a general method for manufacturing an ion-exchange membrane, and then to react said ion-exchange membrane with a polyether compound having a functional group (e.g. amino group etc.) capable of chemically bonding with haloalkyl group. More specifically speaking, the method consists of forming a monomer composition, comprising a monomer having a haloalkyl group, crosslinking monomer and a polymerization initiator, into the shape of a film, then polymerizing said monomer composition, dipping the obtained film-shaped material into a solution containing a polyether compound containing amino group and reacting with the polyether compound and fixing, and introducing a cation-exchange group or an anion-exchange group, as necessary, By this method, it is possible to easily control the location to fix the polyether compound by varying the dipping condition. For example, by dipping the film-shaped material having haloalkyl group in a solution containing a polyether compound with such a high molecular weight as not to penetrate into the membrane, said polyether compound can be fixed at the surface layer part of the membrane, and in case of further fixing a polyether compound to inside of the membrane, an ion-exchange membrane, in which different polyether compounds are fixed at the surface of the membrane and inside of the membrane, can be obtained by dipping the film-shaped material in a solution containing a polyether compound with such a low molecular weight as to be able to penetrate into the membrane. From the viewpoint of the security of the fixation, it is particularly preferable to fix it by such a chemical bonding mode.

As aforementioned, the ion-exchange membrane of the present invention has the characteristics of a high resistance against organic fouling and a low membrane resistance. Thus the ion-exchange membrane of the present invention can be used not only in applications in which resistance against organic fouling is not necessary, but also can be used preferably as the ion-exchange membrane in case of manufacturing, from an aqueous solution containing low molecular weight electrolytes and high molecular weight organic compounds (solution to be treated), an aqueous solution, in which the concentration of said low molecular weight electrolytes is reduced (hereinafter referred to also simply as desalinated solution), by removing the aforementioned containing low molecular weight electrolytes through electrodialysis using an ion-exchange membrane. In case of using the ion-exchange membrane of the present invention in such an electrodialysis, it is possible to conduct the electrodialysis stably for a long period, because it is resistant against organic fouling of the above-mentioned high molecular weight organic compounds that could become organic macroions etc. Moreover, electric power consumption does not increase, because its membrane resistance is similar to that of a conventional ion-exchange membrane to which no polyether compound is fixed.

The above-mentioned low molecular weight electrolytes are the electrolytes to be removed and usually mean organic acids or inorganic acids with molecular weight of 1,000 or less or organic salts or inorganic salts with molecular weight of 1,000 or less. Inorganic salts such as sodium chloride, potassium chloride, etc. or organic acids or amino acids with molecular weight of 1,000 or less such as citric acid, gluconic acid, tartaric acid, glycine, alanine, cystine, etc. are their specific examples.

The above-mentioned high molecular weight organic compounds are organic compounds or organic ions having higher molecular weight than the aforementioned low molecular weight electrolytes and mean the useful components that wants to be remained in the solution to be dialyzed or the components that is not necessary to be removed. As such high molecular weight organic compounds there can be mentioned saccharides such as glucose, fructose, maltose, xylose, sucrose, raffinose, and other oligosaccharides, etc.; alcohols and glycols such as methanol, ethanol, propanol, glycerol, etc.; organic acids such as gluconic acid, humic acid, etc. and their salts; amino acids such as glutamic acid, glycine, etc. and their salts; vitamins; extracts of sarcocarp, seafood, etc.; natural polymers such as polyphenols, various proteins, nucleic acids, enzymes, etc.; oligopeptides; antibiotics; coenzymes; surface-active agents such as dodecylbenezenesulfonic acid etc.; water-soluble synthetic polymers such as polyvinyl alcohol, polyvinylpyrrolidone, etc.; etc.

The solution to be dialyzed, used in the above-mentioned method for manufacturing desalinated solution is not particularly restricted, if it is an aqueous solution containing the above-mentioned low molecular weight electrolytes and high molecular weight organic compounds. From the viewpoint of manufacturing efficiency, however, the content of the above-mentioned low molecular weight electrolytes and high molecular weight organic compounds in the solution to be dialyzed is preferably 1–100,000 ppm (based upon weight, same for the followings) and 1–500,000 ppm, respectively, and particularly 100–10,000 ppm and 100–100,000 ppm, respectively.

As such solutions to be dialyzed, there can be mentioned as examples, non-distilled alcoholic beverage (e.g. wine etc.), fruit juice, etc. containing 100–10,000 ppm of organic acids etc. as low molecular weight electrolytes and containing total 1,000–50,000 ppm of polyphenols, saccharides, etc. as high molecular weight organic compounds; molasses of glucose, fructose, etc. containing 100–10,000 ppm of inorganic salts as low molecular weight electrolytes and containing total 1,000–100,000 ppm of polysaccharides etc. as high molecular weight organic compounds. Namely, the aforementioned method of the present invention can be preferably applied particularly in the synthetic process or purifying process of foodstuff, pharmaceuticals, agricultural chemicals, etc., in the desalination process of brine or waste water, or in the manufacturing process of drinking water.

As the electrodialyzer used in the above-mentioned method for manufacturing desalinated solution, a known electrodialyzer can be used without particular restriction, if it has the fundamental structure constituted by arranging a cation-exchange membrane and an anion-exchange membrane, at least either of which comprises the ion-exchange membrane of the present invention between the anode and cathode. For example, an electrodialyzer, such as filter press type, unit cell type, etc., comprising the fundamental structure in which anion-exchange membrane and cation-exchange membrane are alternately arranged and these ion-exchange membranes and chamber frames form desalination chambers and concentration chambers, is preferably used. The number of membrane, passage space of the desalination chamber and concentration chamber (membrane distance), etc. used in such an electrodialyzer are suitably chosen depending upon the kind and treating amount of the organic substance to be treated. In case, however, the above-mentioned high molecular weight organic compounds are negatively charged, it is preferable to use the anion-exchange membrane of the present invention as the anion-exchange membrane, because an anion-exchange membrane is susceptible to organic fouling. On the other hand, in case the above-mentioned high molecular weight organic compounds are positively charged, it is preferable to use the cation-exchange membrane of the present invention as the cation-exchange membrane.

The method of the present invention for removing low molecular weight electrolytes from the above-mentioned solution to be dialyzed by using such an electrodialyzer is carried out by supplying the desalination chamber of the electrodialyzer with the above-mentioned solution to be dialyzed and the concentration chamber with the electrolyte solution, respectively, and by passing the direct current between the anode and cathode in the state in which the anode chamber and cathode chamber are supplied by the electrode solution comprising the electrolyte solution. By passing the current in such a manner, the low molecular weight electrolytes in the organic substance solution supplied in the desalination chamber dissociate into anion and cation and each of them passes through the anion-exchange membrane and cation-exchange membrane and is discharged to the concentration chamber side, and thus the low molecular weight electrolytes can be removed from the solution to be dialyzed with the lapse of time. In such an electrodialysis, the voltage applied to the electrodialyzer, current density and treating time may be suitably decided depending upon the kind, concentration, etc. of the low molecular weight electrolytes to be removed.

EXAMPLES

Then Examples will be mentioned in order to describe the present invention more specifically. The present invention, however, should not be restricted to these Examples in any way. The characteristics of the ion-exchange membranes shown in Examples and Comparative Examples are measured by the following methods.

(1) Ion-Exchange Capacity and Water Content

An ion-exchange membrane was soaked in 1 mol/L HCl aqueous solution for 10 hours or more. After that, in case of a cation-exchange membrane, the hydrogen ion type was replaced into the sodium ion type with 1 mol/L NaCl aqueous solution and the isolated hydrogen ion was determined by a potentiometric titrator (COMTITE-900; made by Hiranuma Sangyo Co., Ltd.) (Amol). On the other hand, in case of an anion-exchange membrane, the chloride ion type was replaced into the nitrate ion type with 1 mol/L NaNO$_3$ aqueous solution and the isolated chloride ion was determined by a potentiometric titrator (COMTITE-900; made by Hiranuma Sangyo Co., Ltd.) (Amol).

Then the same ion-exchange membrane was soaked in 1 mol/L HCl aqueous solution for 4 hours or more and washed sufficiently with ion-exchanged water. After that, the membrane was taken out and the weight in wet state (Wg) was measured after water on the surface had been wiped off with tissue paper etc. Then the membrane was placed in a vacuum dryer, dried at 60° C. for 5 hours and then taken out and the weight in dry state (Dg) was measured. The ion-exchange capacity and water content were calculated by the following equations:

Ion-exchange capacity=$A \times 1000/W$ [mmol/g-dry membrane]

Water content=$100 \times (W-D)/D$ [%].

(2) Measurement of Membrane Resistance

An ion-exchange membrane was placed in a 2-compartment cell having platinum black electrode plates and the both sides of the ion-exchange membrane were filled with 3 mol/L H$_2$SO$_4$ aqueous solution. The resistance between the electrodes at 25° C. was measured with an alternating current bridge (frequency: 1000 cycles/second) and the difference between said resistance between the electrodes and the resistance between the electrodes, measured in case no ion-exchange membrane was placed, was recorded as the membrane resistance. The membrane used for the above-mentioned measurement was previously brought to the equilibrium in 3 mol/L H$_2$SO$_4$ aqueous solution.

(3) Measurement of Resistance Against Organic Fouling

An obtained anion-exchange membrane was conditioned by soaking in 0.1 mol/L NaCl aqueous solution for 1 hour and washing with water. Then said anion-exchange membrane was placed in a 2-compartment cell having a silver electrode and silver chloride electrode. Its anode chamber was filled with 100 cc of 0.1 mol/L NaCl aqueous solution and its cathode chamber was filled with a mixed solution containing 500 ppm of sodium dodecylbenezenesulfonate as a high molecular weight organic compound and 0.1 mol/L of NaCl as a low molecular weight electrolyte. The solutions in both chambers were stirred at a rotation speed of 1000 rpm and the electrodialysis was conducted at the current density of 10 mA/cm². At that time the change of the voltage in the membrane with the time was measured by using platinum wires fixed near both surfaces of the membrane. The voltage in the membrane increases when the organic fouling occurs during the current passing. The difference between the voltage in the membrane after 30 minutes from starting the current passing and the voltage in case no organic fouling substances were added (ΔE) was recorded as the measure of the fouling property of the membrane. The smaller ΔE is, the higher can the resistance against organic fouling be said to be.

Examples 1–3

A monomer composition in paste form comprising 90 parts by weight of chloromethylstyrene, 10 parts by weight of industrial divinylbenzene, 5 parts by weight of benzoyl peroxide, 3 parts by weight of styrene oxide and 5 parts by weight of nitrile butadiene rubber was coated on one surface of polyvinyl chloride cloth and after said coated surface and the other surface of said cloth were covered with 100 μm thick polyester film as the peeling material, it was polymerized by heating at 80° C. for 8 hours under elevated pressure of 0.4 MPa with nitrogen.

Then the obtained film-shaped material was soaked in each of 15% by weight methanol solutions of 3 kinds of polypropylene glycol bis 2-aminopropyl ether having different molecular weight shown in Table 1 at room temperature for 1 day to obtain 3 kinds of membranes. After that the unreacted polypropylene glycol bis 2-aminopropyl ether remaining on each membrane was removed by washing with methanol and then with water. Each obtained film-shaped material was reacted in an amination bath comprising 10 parts by weight of 30% by weight aqueous solution of trimethylamine, 50 parts by weight of water and 5 parts by weight of acetone at room temperature for 5 hours, soaked in 0.5 mol/L HCl aqueous solution and then washed with ion-exchanged water 5 times to obtain quaternary ammonium type anion-exchange membrane.

On analyzing each obtained ion-exchange membrane by FT-IR, a peak was observed at 1108 cm⁻¹ belonging to an ether bond and the existence of a polyether compound was confirmed.

Moreover, 0.1 g of each obtained ion-exchange membrane was placed in a test tube and 5 ml of 57% by weight hydroiodic acid (specific gravity: 1.7) was added thereto little by little. After adding boiling tips and reacting at 125° C. for 1.5 hours, the reaction mixture was cooled and transferred to a separating funnel. After decomposing the excess of iodine by adding a small amount of 10% by weight sodium thiosulfate aqueous solution, it was extracted with 50 ml of diethyl ether. The ether layer was washed with ca. 50 ml of 10% by weight sodium thiosulfate aqueous solution, dehydrated with sodium sulfate and filtered. As a result of analyzing the solution by gas chromatograph mass spectrometry (GS-MS), propylene iodide (ICH$_2$CH(CH$_3$)I), a decomposition product of polypropylene glycol, was confirmed.

Further, in order to confirm the existing location of the polyether compound, the membrane, on which a polyether compound was fixed, before the treatment with trimethylamine, was soaked in a mixed solvent of methyl iodide/hexane=40/60 ratio by weight at room temperature for 1 day to qaternarize the nitrogen atom, the bonding part of the polyether compound and the ion-exchange membrane, into a quaternary ammonium base. Then the ion-exchange membrane was ion-exchanged into MnO$_4^-$ by dipping it in 1% by weight potassium permanganate aqueous solution and the qualitative analysis of Mn element at the membrane section by SEM-EDS. As a result, a peak belonging to Mn was observed at the surface layer part of the membrane.

The content of the polyether compound was calculated by subtracting the membrane weight before reacting with the polyether compound from the membrane weight after the reaction.

Ion-exchange membrane characteristics of each obtained anion-exchange membrane were measured. Results are shown in Table 1.

TABLE 1

| | Content of polyether compound [wt %] | Exchange capacity [mmol/g] | Water content [%] | Membrane resistance [Ω · cm²] | Organic fouling ΔE [V] | Molecular weight |
|---|---|---|---|---|---|---|
| Example 1 | 0.5 | 2.02 | 35 | 1.6 | 9.5 | 200 |
| Example 2 | 0.5 | 2.00 | 36 | 1.7 | 8.7 | 2000 |
| Example 3 | 0.8 | 2.03 | 36 | 1.7 | 8.5 | 4000 |

Comparative Example 1

A quaternary ammonium type anion-exchange membrane was obtained by the same operation as Example 1 except that no treatment of fixing a polyether compound in Example 1 was conducted. Ion-exchange membrane characteristics of the obtained anion-exchange membrane were measured. Results are shown in Table 2.

TABLE 2

| | Exchange capacity [mmol/g] | Water content [%] | Membrane resistance [Ω · cm²] | Organic fouling ΔE [V] |
|---|---|---|---|---|
| Comparative Example 1 | 2.05 | 34 | 1.5 | 13.0 |

Examples 4–5

The film-shaped material polymerized in the same manner as Example 1 was soaked in each of 50% by weight aqueous solutions of the compounds, obtained by ring-opening reaction of 2 kinds of phenylglycidyl(polyethylene glycol) having different molecular weight shown in Table 3 with dimethylamine, at room temperature for 1 day to obtain 2 kinds of membranes. After that the unreacted compound remaining on each membrane was removed by washing with methanol and then with water. Each obtained film-shaped material was reacted in an amination bath comprising 10 parts by weight of 30% by weight aqueous solution of trimethylamine, 50 parts by weight of water and 5 parts by weight of acetone at room temperature for 5 hours, soaked in 0.5 mol/L HCl aqueous solution and then washed with ion-exchanged water 5 times to obtain quaternary ammonium type anion-exchange membrane. On analyzing each obtained ion-exchange membrane by FT-IR in the same manner as Example 1, a peak was observed at 1108 cm⁻¹ belonging to an ether bond. Moreover, the obtained ion-exchange membrane was analyzed by gas chromatograph mass spectrometry (GS-MS), after the reaction with hydroiodic acid in the same manner as Example 1. As a result, ethylene iodide, a decomposition product of ethylene glycol, was confirmed. Ion-exchange membrane characteristics of each obtained anion-exchange membrane were measured. Results are shown in Table 3.

TABLE 3

| | Content of polyether compound [wt %] | Exchange capacity [mmol/g] | Water content [%] | Membrane resistance [Ω · cm$^2$] | Organic fouling ΔE [V] | Molecular weight |
|---|---|---|---|---|---|---|
| Example 4 | 2.0 | 2.02 | 34 | 1.7 | 10.0 | 200 |
| Example 5 | 3.0 | 2.01 | 35 | 1.7 | 9.4 | 400 |

Examples 6–7

Two kinds of monomer compositions in paste form were obtained by adding to a mixture comprising 90 parts by weight of chloromethylstyrene, 10 parts by weight of industrial divinylbenzene, 5 parts by weight of benzoyl peroxide, 3 parts by weight of styrene oxide and 5 parts by weight of nitrile butadiene rubber, 5 parts by weight of polyethylene glycol diacrylate in Example 6, and 5 parts by weight of polyethylene glycol bis carboxymethyl ether in Example 7, respectively. The obtained monomer composition in paste form was coated on one surface of polyvinyl chloride cloth and after said coated surface and the other surface of said cloth were covered with 100 μm thick polyester film as the peeling material, it was polymerized by heating at 80° C. for 8 hours under elevated pressure of 0.4 MPa with nitrogen.

Then each obtained film-shaped material was reacted in an amination bath comprising 10 parts by weight of 30% by weight aqueous solution of trimethylamine, 50 parts by weight of water and 5 parts by weight of acetone at room temperature for 5 hours, soaked in 0.5 mol/L HCl aqueous solution and then washed with ion-exchanged water 5 times to obtain quaternary ammonium type anion-exchange membrane. On analyzing the obtained ion-exchange membranes by FT-IR in the same manner as Example 1, a peak was observed at 1108 cm$^{-1}$ belonging to an ether bond. Moreover, after reacting the obtained ion-exchange membrane with hydroiodic acid in the same manner as Example 1, ethylene iodide, a decomposition product of ethylene glycol, was confirmed as a result of analyzing by gas chromatograph mass spectrometry (GS-MS). Ion-exchange membrane characteristics of the obtained anion-exchange membranes were measured. Results are shown in Table 4.

TABLE 4

| | Content of polyether compound [wt %] | Exchange capacity [mmol/g] | Water content [%] | Membrane resistance [Ω · cm$^2$] | Organic fouling ΔE [V] | Molecular weight |
|---|---|---|---|---|---|---|
| Example 6 | 5.0 | 2.00 | 35 | 1.6 | 10.6 | 2000 |
| Example 7 | 5.0 | 2.02 | 36 | 1.6 | 10.3 | 2000 |

Example 8

After 100 g of polysulfone (made by Amoco) had been dissolved homogeneously in 832 g of dichloroethane under stirring at 50° C. in the nitrogen atmosphere, 67 g of chloromethyl ether and 11 g of zinc chloride were added and reacted at 25° C. for 16 hours under stirring. Then the product was precipitated into a large excess of methanol, dried under reduced pressure and dissolved in chloroform for repurification. The chlorine content of the obtained chloromethylated polysulfone measured by Mohr's method was 6.6% by weight and the number of the introduced chloromethyl groups per repeating unit of the polymer calculated from the chlorine content was 1.2. Further, as a result of the evaluation of the chloromethylated polysulfone by $^1$H-nuclear magnetic resonance spectrum, it coincided with the methylene group concentration appeared at 4.56 ppm and it was confirmed that it was chloromethylated.

The above-mentioned chloromethylated polysulfone was dissolved in tetrahydrofuran to make up to a 20% by weight solution, cast on a glass plate and dried to obtain a film-shaped material with a film thickness of 100 μm.

Then the obtained film-shaped material was soaked in 15% by weight methanol solution of polypropylene glycol bis 2-aminopropyl ether of the molecular weight shown in Table 6 at room temperature for 1 day. After that, the unreacted polypropylene glycol bis 2-aminopropyl ether remaining on the film was removed by washing with methanol and then with water. Then the obtained film-shaped material was reacted in an amination bath comprising 10 parts by weight of 30% by weight aqueous solution of trimethylamine, 50 parts by weight of water and 5 parts by weight of acetone at room temperature for 5 hours, soaked in 0.5 mol/L HCl aqueous solution and then washed with ion-exchanged water 5 times to obtain quaternary ammonium type anion-exchange membrane. On analyzing the obtained ion-exchange membrane by FT-IR in the same manner as Example 1, a peak was observed at 1108 cm$^{-1}$ belonging to an ether bond. Moreover, after reacting the obtained ion-exchange membrane with hydroiodic acid in the same manner as Example 1, propylene iodide, a decomposition product of propylene glycol, was confirmed as a result of analyzing by gas chromatograph mass spectrometry (GS-MS). Ion-exchange membrane characteristics of the obtained anion-exchange membrane were measured. Results are shown in Table 5.

TABLE 5

| | Content of polyether compound [wt %] | Exchange capacity [mmol/g] | Water content [%] | Membrane resistance [Ω · cm$^2$] | Organic fouling ΔE [V] | Molecular weight |
|---|---|---|---|---|---|---|
| Example 8 | 0.5 | 1.50 | 28 | 3.4 | 14 | 200 |

Comparative Example 2

A quaternary ammonium type anion-exchange membrane was obtained by the same operation as Example 8 except that no treatment of fixing a polyether compound in Example 8. Ion-exchange membrane characteristics of the obtained anion-exchange membrane were measured. Results are shown in Table 6.

TABLE 6

|  | Exchange capacity [mmol/g] | Water content [%] | Membrane resistance [Ω · cm²] | Organic fouling ΔE [V] |
|---|---|---|---|---|
| Comparative Example 2 | 1.5 | 30 | 3.0 | 21.0 |

Effect of the Invention

The ion-exchange membrane of the present invention has not only a very excellent resistance against organic fouling, but also excellent fundamental performances required to an ion-exchange membrane such as low membrane resistance and good selective ion permeability. And by using the ion-exchange membrane of the present invention at an electrodialysis, it is possible to remove low molecular weight electrolytes stably for a long time and efficiently from an aqueous solution containing low molecular weight electrolytes and high molecular weight organic compounds. Moreover, the present invention can be applied not only to an ion-exchange membrane, but also to other ion exchangers in different forms such as ion-exchange resin, ion-exchange fiber, etc. to give an excellent resistance against organic fouling.

What is claimed is:

1. An ion-exchange membrane wherein a polyether compound having polyalkylene glycol chain and not having an ester bond is fixed on a surface of the membrane and/or inside of the membrane.

2. An ion-exchange membrane set forth in claim 1 wherein the ion-exchange membrane is an anion-exchange membrane.

3. An ion-exchange membrane set forth in claim 1 wherein the molecular weight of the polyether compound having polyalkylene glycol chain is 50–100,000.

4. An ion-exchange membrane set forth in claim 1 wherein the fixed amount of the polyether compound having polyalkylene glycol chain is 0.001–60% by weight based upon the total weight of the membrane in dry state.

5. An ion-exchange membrane set forth in claim 1 wherein the polyether compound having polyalkylene glycol chain is fixed by a covalent bond.

6. A method for manufacturing an aqueous solution, whose concentration of low molecular weight electrolytes is reduced, which comprises removing the low molecular weight electrolytes, through electrodialysis using the ion-exchange membrane set forth in claim 1, from a solution to be dialyzed containing, as the electrolytes to be removed, low molecular weight electrolytes comprising organic acids or inorganic acids with the molecular weight of 1,000 or less, or organic salts or inorganic salts with the molecular weight of 1,000 or less, and containing high molecular weight organic compounds or organic ions with higher molecular weight than said low molecular weight electrolytes.

7. A method set forth in claim 6 wherein the content of the low molecular weight electrolytes and of the high molecular weight organic compounds in the solution to be dialyzed is 1–100,000 ppm and 1–500,000 ppm, respectively, based upon the weight.

8. A method set forth in claim 6 wherein the solution to be dialyzed is non-distilled alcoholic beverage or fruit juice containing 100–10,000 ppm of organic acids as the low molecular weight electrolytes and containing a total of 1,000–50,000 ppm of polyphenols and/or saccharides as the high molecular weight organic compounds.

9. A method set forth in claim 6 wherein the solution to be dialyzed is molasses containing 100–10,000 ppm of inorganic salts as the low molecular weight electrolytes and containing 1,000–100,000 ppm of polysaccharides as the high molecular weight organic compounds.

* * * * *